United States Patent Office 3,251,842
Patented May 17, 1966

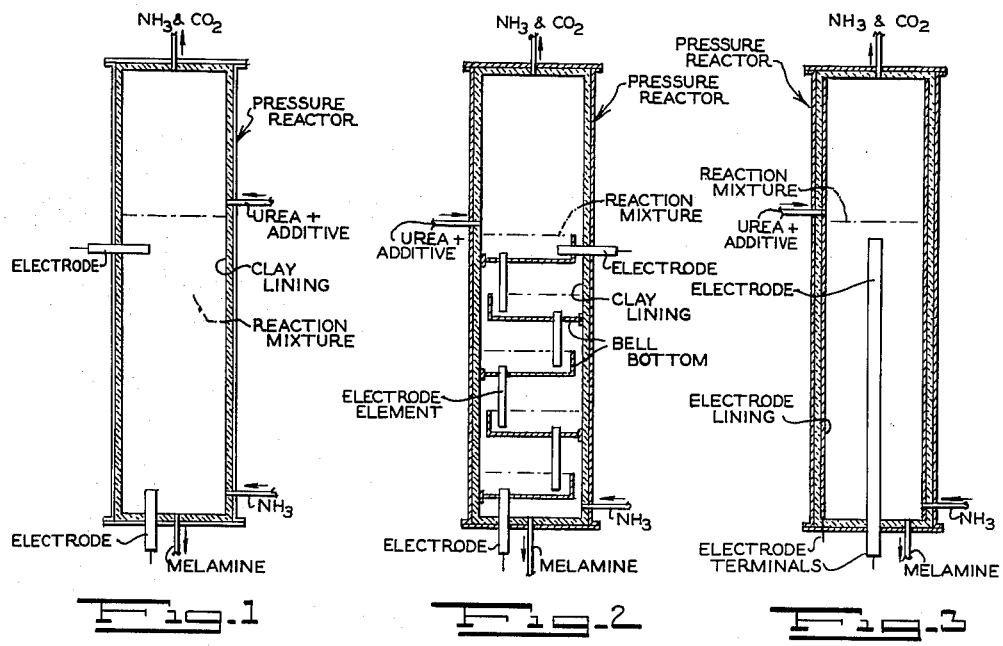
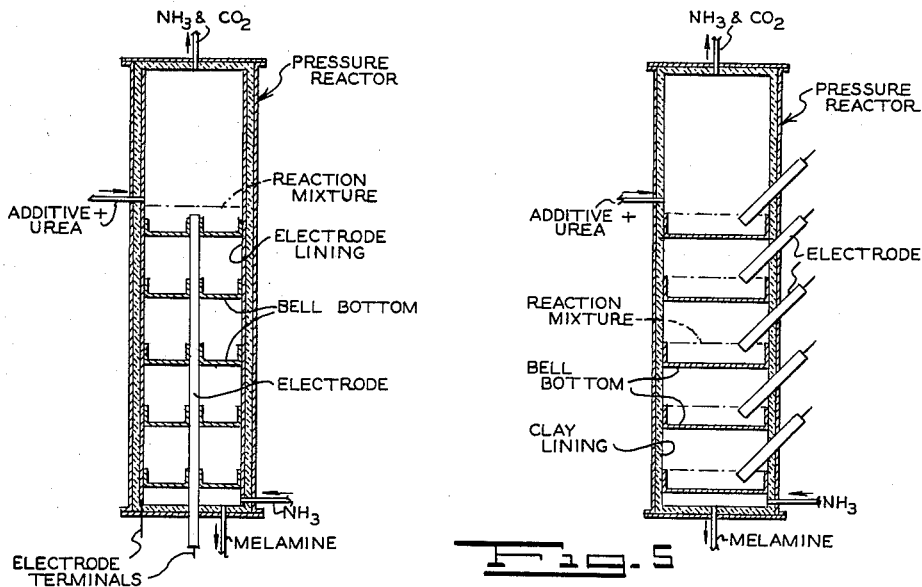

3,251,842
PROCESS FOR THE PRODUCTION OF MELAMINE USING THE SPECIFIC RESISTANCE HEAT OF UREA
Karl Schmitt, Herne, Westphalia, and Josef Disteldorf and Hans-Jurgen Haage, Wanne-Eickel, Germany, assignors to Hibernia-Chemie Gesellschaft mit beschrankter Haftung, Gelsenkirchen-Buer, Germany, a corporation of Germany
Filed June 6, 1963, Ser. No. 286,097
Claims priority, application Germany, May 9, 1961, H 42,543; June 6, 1962, H 45,987
12 Claims. (Cl. 260—249.7)

This is a continuation-in-part application of copending U.S. application, Serial No. 193,020, filed May 7, 1962, now U.S. Patent No. 3,141,884, dated July 21, 1964.

The present invention relates to a process for the production of melamine by heating urea together with an electrolyte additive under pressure, and more particularly to such a process using the specific resistance heat of urea generated by the passage of an electric current through the urea.

Conventionally, melamine is produced by heating urea under pressure, as for example by introducing urea, preferably in the form of a melt, into a pressurized reactor, whereby through external heating of the reactor, simultaneously with the autogeneous or self-generated pressure within the reactor, the required reaction conditions are brought about. Usually, the temperature is maintained at about 400° C., and for sufficient degrees of conversion, a time of stay of about 30 minutes up to 2 hours is necessary. In order to stabilize the reaction, pressures of about 100 atmospheres are generally used.

It is also known that the reaction of urea under pressure to form melamine may be favorably influenced by the addition of certain catalysts. For example, the addition of certain metals, particularly iron, in the form of the pure metal, or of the oxide, or of a salt thereof, etc., enhances the reaction.

Up to the present, melamine has not been produced successfully on a large scale, using the aforedescribed processes. Essentially, two main difficulties exist which prevent the application of the conventional melamine processes to large scale industrial undertakings, i.e. the corrosion problem and, closely connected therewith, the problem of supplying sufficient energy or heat for carrying out the reaction in the desired manner. It is known in this connection that the reaction energy $\Delta H_{400°\ C.} = +70$ Kcal. per formula conversion for the reaction equation:

It is obvious from the foregoing that in order to heat the urea and in order to provide sufficient reaction heat for the conversion to melamine, considerable energy is required, which energy must be supplied to the urea in a more or less complete and direct manner. Therefore, with respect to the reaction vessel used, a very good heat exchange must be provided. Particularly because of the prevailing pressure conditions for carrying out the melamine reaction, such heat exchange may only be provided where the reaction vessel is constructed of metallic materials. Additionally, sufficient heat exchange surface must exist between the reaction vessel and the urea melt in order to uniformly distribute the heat for the desired reaction. However, it is well recognized that under the particular reaction conditions of the melamine formation, metallic materials are very strongly attacked, and therefore the reaction vessels become corroded and thus lose their attractiveness. This objectionable result is particularly applicable where iron reaction vessels are used.

Attempts have been made to overcome this drawback of corrosion by lining the reaction vessel with pure metals, such as gold, silver, titanium, tantalum, etc. and also by using linings of highly alloyed steel, such, as for example, those which contain nickel, chromium, vanadium, molybdenum, etc., with iron being present only in comparatively trace amounts. Corrosion protection afforded in this manner, however, is incomplete in a practical sense, since such reaction vessels have only limited capacity due to the high cost of the metallic materials employed. Therefore, attempts to line the reaction vessel with pure or noble metals or highly alloyed steels must fail where large scale industrial processes are concerned, due to the prohibitive cost for the installations alone.

Sporadically, attempts have been made to provide reaction vessels for the melamine reaction wherein the vessel is lined with glass. Of course, for widespread industrial processes, developments of this kind must be eliminated from consideration, especially because of the impracticality of construction and the lack of durability in use of glass-lined apparatus.

In summary, it must be concluded that while numerous attempts have been made to solve the problem of carrying out the production of melamine by way of specialized reactors containing linings of non-corrosive materials, these attempts have not led to any success in practice because of the impracticality and/or economic unfeasibility of the undertakings contemplated.

As for the use of non-metallic materials in place of metallic materials for the reaction vessel, up to the present this has not been considered, due to the fact that no provision was known for introducing the necessary total energy and heat required for the conversion, in a sufficiently effective manner to permit industrial scale apparatus to be operated. While it has been proposed already to line with graphite the reaction vessel which is to be charged with the melamine forming substance, this technique is objectionable mostly because of the insulation properties of such non-metal. Specifically, heat cannot be transferred to the reaction mixture through the walls of the reaction vessel as in the case of metallic vessels, but instead, the required heat must be supplied to the individual ingredients of the reaction mixture themselves. In this regard, such heat may be contributed by introducing into the reaction vessel ammonia which has been preheated to a temperature between about 500 and 550° C. It is self-evident that this procedure still cannot solve the problem of providing as uniform as possible a heat supply nor a sufficient heat supply for the purpose intended. By utilizing the foreging procedure of introducing pre-heated ammonia, the attainable conversions to melamine are extremely low, and of course, this procedure suffers from the obvious drawback that the pre-heating of ammonia to such high temperatures is beset with the danger of decomposition or explosion.

In accordance with the disclosure of said co-pending application Serial No. 193,020, now U.S. Patent No. 3,141,884, dated July 21, 1964, melamine is produced by heating urea under autogenous pressure by means of current carrying conductors located in the interior of the reactor, with non-metallic materials being provided for the inside lining of the reactor so as to avoid the drawbacks noted above. A pair of electrodes may extend into the reactor for passage of current therebetween in the reactor, or one electrode may be used together with the non-metallic lining as counter-electrode, such as where the lining is a graphite lining. An essential feature of the process of said co-pending application is that the urea melt reaction material is used as the current carrying conductor within the reactor. Such process is based upon the finding that urea possesses a conductivity value sufficient to permit its direct utilization as conductor of electric current and hence as a resistance material for generating heat within the reactor. However, as now has been established, in carrying out such process, care must be taken of the fact that the intermediate products, produced in the transformation of urea to melamine, possess a conductivity value, like that of melamine, which is several times lower than that of urea. Some difficulty, of course, is encountered in conveying the necessary energy through the zones of the reactor in which the main conversion takes place, especially with respect to the design and arrangement of the electrodes which may be utilized.

It is an object of the present invention to overcome the foregoing drawbacks and to provide a process for the production of melamine utilizing the specific resistance heat of urea in the presence of an electrolyte additive which will be almost entirely dissociated under the reaction conditions.

It is a further object of the invention to provide a more efficient process for the production of melamine by heating urea under pressure by passing an electric current through the urea in the presence of such electrolyte additive to generate heat therein as a function of the specific resistance of the urea to the current being passed therethrough with the electrolyte additive creating a basic or underlying conductivity which is practically unaffected by the various states of the chemical systems present.

Other and further objects of the invention will become apparent from a study of the within specification and the accompanying drawings in which:

FIG. 1 is a schematic elevation of a vertical reactor through which the electrolyte additive-urea mixture and ammonia are passed in counter-current to one another, the heating being carried out by passing a current between electrodes positioned in the reaction mixture;

FIG. 2 is a schematic elevation of a vertical reactor in accordance with a further embodiment of the invention in which a greater number of electrode elements are positioned within the reaction mixture;

FIG. 3 is a schematic elevation of a vertical reactor in accordance with another embodiment of the invention containing a centrally disposed electrode within the reaction mixture, with the opposing electrode being defined by a suitable lining on the inside wall of the reactor;

FIG. 4 is a schematic elevation of a further embodiment of a vertical reactor in accordance with the invention, wherein bell-bottom inserts are used to separate the reaction mixture into a number of subdivisions; and FIG. 5 is a schematic elevation of a vertical reactor in accordance with an alternate embodiment of the invention wherein individual electrodes are inserted into individual subdivision zones of the reaction mixture.

It has been found in accordance with the present invention that an improved process for the production of melamine by heating urea under pressure may be provided, which comprises carrying out the heating of urea melt under pressure by passing an electric current through the urea melt in admixture with at least one of an acid, acid salt, and acid anhydride as additive electrolyte to generate heat therein as a function of the specific resistance of the urea to the current being passed therethrough for forming melamine, the additive electrolyte being practically completely dissociated under the reaction conditions so as to create a basic or underlying conductivity which is practically unaffected by the various states of the chemical system present. Specifically, the heating is carried out for a residence time between about 2 minutes and 2 hours in a closed zone having a non-metallic lining, in order to avoid corrosion, and temperatures may be used which range between about 300 and 500° C., whereas autogenous pressures may be used which range between about 50 and 300 atmospheres absolute, the additive being present in an amount between about 0.1–5% by weight based on the amount of urea present. The amount of the liquid reaction mass, including urea, additive, by-products and melamine, present in the closed zone is preferably maintained such that a constant amount between about 50–95% of said mass in the zone is present as melamine. For best results, the electric current used is in the form of alternating current.

In accordance with a preferred embodiment of the invention, the heating is carried out in the additional presence of ammonia, and the admixture of additive and urea is passed along a reaction path in counter-current to the ammonia, whereby melamine produced under the reaction conditions may be recovered from one end of the reaction path while carbon dioxide and ammonia produced as by-products may be recovered from the other end of the reaction path. The melamine is recovered preferably in an amount sufficient to preserve in the reaction mass a remaining amount of melamine within the aforesaid 50–95% range.

Suitably, the melamine production may be carried out in the presence of a metallic catalyst if desired, such as a catalyst consisting of a base metal, a base metal oxide, and/or a base metal salt, such as iron oxide, etc.

Advantageously, the melamine formed by the reaction is recovered in liquid form while the carbon dioxide and ammonia are recovered in gaseous form, and for this reason a vertically extending reactor is preferred, wherein the urea-additive electrolyte mixture is added to the upper end thereof and the ammonia is added to the lower end thereof, whereby the heavier urea will flow downwardly while the gaseous ammonia will bubble upwardly through the reaction mixture for maximum contact between the ingredients.

Suitably, the carbon dioxide and ammonia in gaseous form may be recovered from the upper end of the vertical reactor and conducted to a cooling step, preferably without change in pressure, and thereafter converted to urea in the conventional manner, so that the urea formed thereby may be recycled back to the melamine process step, for the conservation and efficiency of the over-all reaction.

In accordance with a preferred embodiment of the invention, an improvement is provided in the process for the production of melamine by heating urea under pressure in a closed reaction zone having a non-metallic lining, such improvement contemplating the carrying out of the heating of the urea in the form of a melt admixture with the additive electrolyte under pressure in the additional presence of gaseous ammonia to produce melamine, carbon dioxide, and ammonia, by passing an alternating current through the reaction mixture to generate heat as a function of the specific resistance of urea to the current, the temperature being maintained between about 300 and 500° C., and preferably 350 to 420° C., and the autogenous pressure being maintained between about 50 and 300 atmospheres absolute, and preferably about 100 atmospheres absolute. The urea is preferably pre-heated to about 200° C. to form the melt and ammonium chloride or ammonium phosphate is preferably used as additive in an amount of about 2% based on the amount of urea present. The reaction may be carried out for a period of from about 2 minutes to 2 hours, although a period of at least 30–40 minutes is desirable, unless stronger reaction conditions and/or the use of a catalyst is contemplated. Alternating current of about 50–60 Hertz has been found to be particularly suitable, using a voltage of about 6 volts and current of about 1000 amperes, and where a catalyst is to be used, 0.5% by weight of iron oxide has proved to be efficient enough for the reaction to be maintained at about 370° C. The ratio of urea to melamine is preferably maintained in the zone at about 20:80.

Thus, the present invention permits the required energy to be supplied to the urea more efficiently and in such a manner that the entire corrosion problem which beset the use of metallic reactors is completely eliminated. Practically speaking, this is only possible where the energy is introduced into the urea melt by way of electricity. The lining of the reaction vessel, as well as other parts of the apparatus, which may be exposed to corrosion, may be made of non-metallic materials which are inert with respect to the reactants under the reaction conditions, since the supply of energy necessary for heating up the reaction materials and for carrying the reaction at least in part, is effectively produced within the reaction vessel itself by passing electricity through the reaction mixture, and specifically the urea-additive electrolyte admixture. Actually, the urea and/or the reaction mixture will serve as the electrical resistance for the current conducted therethrough significantly via the additive electrolyte whereby heat will be generated more efficiently in an amount sufficient for the desired purpose. Furthermore, because of the nature of the heat generation, the required reaction heat will be uniformly distributed throughout the interior of the reaction vessel.

In spite of the past considerations, it had been found surprisingly in said copending application Serial No. 193,020, now U.S. Patent No. 3,141,884, dated July 21, 1964, that electrical conductivity not only exists in urea, but exists specifically to a degree that it is possible to use urea directly as current conductor and thereby as resistance heating means. The discovered behavior of urea in this regard was even more surprising since, as far as was evident in the literature up to that time, data did not exist which indicated the conductivity of urea melts and, on the other hand, by reason of the known electrical behavior of similar organic substances, no conclusion could have been drawn reasonably that the conductivity of urea melts would attain the discovered order of magnitude.

As opposed to the discovery of the significant behavior of urea to the passage of electric current therethrough, the present invention represents an improvement thereover which contemplates the inclusion in the reaction mixture of an additive electrolyte which is almost entirely, if not entirely, dissociated under the reaction conditions, so as to create a basic or underlying conductivity which is practically unaffected by the various states of the chemical systems present. It is, therefore, necessary that the additive electrolyte be dissolved by the molten reaction material under the reaction conditions employed, and in turn, be dissociated into its ions. Such additive electrolyte substances include particularly acids, especially mineral acids, and preferably such acids in the form of their salts or anhydrides. Preferred among these are ammonium compounds and principally ammonium chloride and ammonium phosphate. In this connection, the acids conteplated include halogen acids, such as hydrogen chloride, hydrogen bromide, hydrogen iodide, hydrogen fluoride, hypochloric acid, etc.; the phosphorous acids, such as orthophosphoric acid, orthophosphorous acid, etc.; sulfur acids, such as sulfuric acid, sulfurous acid, etc., boron acids, such as boric acid, perboric acid, etc.; nitrogen acids including nitric and nitrous acids; chromic and chromous acids, and the like. The various metallic salts of these acids are especially useful in addition to the ammonium salts, and these further salts include acid salts of potassium, sodium, calcium, magnesium, barium, aluminum, lithium, boron, chromium, manganese, iron, cobalt, nickel, copper, zinc, silver, tin, antimony, lead, mercury, etc., such as the alkali metal and earth alkali metal salts of the halogen acids, phosphorus acids, sulfur acids, and nitrogen acids. Specifically, such salts include sodium chloride, potassium chloride, calcium chloride, magnesium chloride, barium chloride, aluminum chloride, lithium chloride, the heavy metal chlorides, and corresponding bromide, iodide, and fluoride salts, as well as the corresponding phosphate, phosphite, sulfate, sulfite, nitrate, nitrite, etc. It will be appreciated that various mixed salts may also be employed, such as sodium ammonium acid phosphate, ferrous ammonium sulfate, sodium potassium sulfate, etc.

The corresponding anhydrides of the foregoing acids may also be employed in accordance with the present invention as the additive electrolyte substance, and these anhydrides include, for instance, phosphorus pentoxide, phosphorus trioxide, sulfur trioxide, sulfur dioxide, nitrogen pentoxide etc.

If the electrolyte is added in form of a free acid the corresponding ammonium salt is obtained because of the presence of ammonia during the reaction. With respect to any of the additive electrolytes in accordance with the invention, the same may be included generally in a range from about 0.1 to 5% by weight as based upon the amount of urea present. However, the choice of the particular additive used and the amount thereof may be determined by practical measures to achieve expediently an approximate specific resistance, for example, of 15 ohm-centimeters in the stationary or equilibrium state during the reaction. In the undecomposed state, urea possesses such specific resistance of 15-ohm-centimeters at 200° C. The addition of 2% ammonium chloride, for instance, decreases this resistance to about 7–8 ohm-centimeters. While in the thermal transformation of urea to melamine without an electrolyte additive in accordance with the present invention, the specific resistance increases to about 5,000 ohm-centimeters, such resistance may now be kept by the specified amount of additive electrolyte, such as ammonium chloride, to about 15-ohm-centimeters throughout the reaction. The presence of the additive electrolyte in accordance with the invention, therefore, simplifies the over-all process in a manner which is immediately apparent, inasmuch as the energy supply may be reduced during the thermal transformation because of the reduction in specific resistance value from the previous 5,000 ohm-centimeter amount to the 15 ohm-centimeter amount.

Any manner of combining the urea with the additive electrolyte in accordance with the present invention may be used, but in the usual case, the electrolyte additive will be introduced into the reactor together with the urea in the required amount. In this connection, it will be appreciated that the especially effective manner of supplying energy for the transformation reaction, which is achieved herein, permits the reaction to be performed in an extremely simple manner, whereby the mixture of the urea and additive electrolyte may be fed, under the reaction conditions, into the melted mass of already reacted materials, preferably with the reaction mixture always containing a certain minimum amount of already formed melamine. The advantages of such a requirement are twofold. On the one hand, the formation of solid intermediates which takes place in the usual procedure is avoided as well as the attendant danger of clogging of the reactor, whereas, on the other hand, a uniform conductivity is achieved over the entire reaction area, so that practically no conductivity gradient occurs.

Specifically, therefore, in accordance with the invention, because of the presence of the additive electrolyte, urea may now be employed directly in a more efficient system for heating the reaction mixture by immersing electrodes, which are insulated with respect to the reactor walls, in a suitable manner into the melt mixture and causing current to flow between the electrodes, more advantageously because of the presence of the additive electrolyte, i.e. by applying a suitable voltage. If desired, the reactor wall or lining may serve as an electrode. In any case, the heat required for the reaction is directly produced in the urea itself, whereby the most direct and homogeneous heat transfer possible will occur.

The carrying out of the melamine process in accordance with the invention is favorably aided by the fact that the gaseous constituents, such as the ammonia and carbon dioxide possess a resistance to current flow which is higher by several orders of magnitude than the resistance to current flow of the urea melt itself. Accordingly, the current through the reaction mixture will flow chiefly via the additive electrolyte and hence through the urea, whereby heat will be developed chiefly where the urea is situated, i.e. where lower or less complete conversion has taken place. For example, as aforesaid, urea possesses a specific resistance at 200° C. of only about 15-ohm-centimeters, while in contrast thereto, melamine possesses at 400° C. a specific resistance of 5,000 ohm-cm. The favorable conditions with respect to urea are even more favorable at higher temperatures. In this regard, the gas phase of $NH_3:CO_2$ which is in the molar ratio of approximately 2:1, corresponding to the reaction gases of the melamine production, when standing under a pressure of 20 atmospheres, exhibits at 200° C., a specific resistance of about $10^6$ ohm-cm. In order to terminate or minimize undesired electrolytic side reactions and decompositions of manifold nature, alternating current is used appropriately for the heat generation, even at a frequency greater than 50–60 Hz., if desired.

Advantageously, as aforesaid, by reason of the specific form of heat generation, it is possible to avoid the use of a metallic lining for the reactor vessel interior walls, whereby it has become possible not only to line the reactor walls with non-corrosive and non-sensitive material, but also to omit the substantially more sensitive heat exchanger apparatus within the reactor necessary under former circumstances.

The specific type of lining for the reactor walls depends substantially upon whether the reactor interior wall is to be used as an electrode for the current or not. In the instance where such wall is to be used as an electrode, such materials are used, preferably, which conduct the electric current well, including in particular coal, graphite, carbonaceous materials, and the like, simple carbon in shaped solid form being expedient for the purpose. Where the reactor walls are not used as an electrode, only such materials may be used as reactor lining which do not conduct the electric current to a greater degree than the melt itself. Appropriately, such non-conductor linings include insulator materials, such as those containing natural clays, i.e. materials containing silicon, such as kaolin and the like, materials containing aluminum, such as corundum, and the like, materials containing magnesium, such as magnesite, and the like, etc.

Because of the provision for carrying out the melamine production using electrical current for heating purposes, it is now possible to carry on large scale industrial melamine production without being confronted with the usual corrosion difficulties. Of course, due to the fact that electricity is used for the heating, the energy supplied for the process may be regulated very simply and with versatility. The energy transmission occurs practically without inertia or current loss especially because of the presence of the additive electrolyte. By omitting the heat exchange apparatus in the interior of the reactor, the entire volume within the reactor is available for any desired manipulations, especially those of a type which are fundamentally not possible in the presence of interfering heat exchange apparatus.

In this connection, built-in bottom inserts may be provided in the reactor whereby the reaction may be carried out in accordance with the counter-current principle for attaining not only more rapid and higher transformations, but also separate reaction paths for the liquid phase and the gaseous phase. As aforesaid, where urea in melt form is introduced into the upper portion of a vertical reactor, together with the additive electrolyte, such urea because of its weight, will gravitate downwardly through the aforementioned built-in bottom elements, whereas the gases which form will flow upwardly in opposite direction, perhaps under the inclusion of additional ammonia for stabilization, the gases also passing through the built-in bottom elements. Advantageously, the urea and additive electrolyte are added at a point above the level of the reaction mixture, and the gas is added to the bottom portion of the reactor at a point above the outlet for the melamine. It has been found that the gases which leave the head of the reactor are free from condensed constituents, whereby it is possible to further work up this urea-free and melamine-free gaseous mixture consisting of ammonia and carbon dioxide, under intermediate cooling, such as with liquid ammonia, to a reaction temperature suitable for urea synthesis. While such urea synthesis may be carried out in a separate arrangement, such arrangement may be appropriately connected with the melamine reactor without loss of pressure in the over-all system. In this manner, urea formed in the urea synthesis of the ammonia and carbon dioxide gas, in accordance with conventional procedures, may be recycled to the melamine reactor with an appropriate amount of make-up additive electrolyte, if needed, to obtain a higher degree of efficiency for the over-all conversion.

The usual conditions for the melamine synthesis are employed, of course, contemplating urea pre-heated to about 200° C. to form the melt, temperatures between 300 and 500° C., and preferably between about 350 and 420° C., with autogenous pressures within the range of about 50 to 300 atmospheres absolute, and preferably around 100 atmospheres absolute. The time of stay of the reactants in the reactor will depend upon the particular conditions and generally ranges between about 2 minutes and 2 hours, and particularly 30–40 minutes, whereby a continuous process is rendered possible and the ratio of urea to melamine may range between about 1:1–20, generally. If necessary, the reaction may be favorably influenced by the addition of catalysts, in the known manner, such as those described in German Patent 955,685.

Referring to the drawing, the various vertically extending reactors illustrate fundamental forms which may be used wherein the reactivity of the urea melt including the additive electrolyte is directly utilized for heat generation. Thus, in all of the reactors shown in FIGS 1–5, urea is added together with the electrolyte additive at a point above the level of the reaction mixture, whereas ammonia for stabilizing the system is added near the bottom of the reactor, but at a point above the lower end thereof where the melamine produced is drawn off. Ammonia and carbon dioxide in gaseous form are recovered from the head of the reactor for suitable further work up and possible recycling in the form of urea. In each instance, current is supplied directly to the melt by suitable electrode arrangements. In FIG. 1, one electrode is placed through the wall of the reactor near the upper level of the reaction mixture whereas the opposing electrode is placed in the bottom wall of the reactor so that maximum current passage through the solution via the electrolyte additive will be achieved. The electrodes are connected suitably to a source of alternating current of magnitude sufficient to cause the desired heating under the reaction conditions, such as a source of 6 volts at 1,000 amperes, i.e. 50 Hz. (cycles per second).

In FIG. 2, bottom element built-in installations are provided, similar to the bell bottoms employed in distillation towers. In addition to the electrode elements protruding through the walls of the reactor in a manner similar to the system shown in FIG. 1, electrode elements extending downwardly are provided so that the current conduction between the various electrode elements will be assured only by means of the additive electrolyte-containing intermediate reaction mixture disposed in the bell bottom installations. Current must pass through the reaction mixture itself disposed in each of the bell bottoms in order to complete the circuit from the uppermost electrode protruding through the reactor wall to the lowermost electrode extending through the bottom wall of the reactor. In this instance, an upper level for the liquid reaction mixture is not attained, but rather each of the bell bottom installations serves to hold a portion or pool of reaction mixture subjected to the passage of current therethrough, whereby the desired heating and conversion is attained. Of course, liquid reaction mixture will overflow from one bell bottom installation to the next installation therebelow and the converted reaction mixture will be drawn off from the bottom of the reactor. In reverse direction, the counter-current flow of ammonia is achieved since the ammonia will bubble upwardly between the bell bottom installations in the same manner as the ammonia and carbon dioxide which represent by-products of the reaction. These gaseous constituents are readily recovered from the head of the reactor.

In the embodiments of FIGS. 1 and 2, the reactor walls are provided with non-conductive materials, such as natural clay materials, since specific electrode bodies are provided for the current passage. In both cases, a series connection is achieved since the current passing from one electrode to the other must pass, in turn, through the appropriate portion of the reaction mixture therebetween. While a simple arrangement is provided in the embodiment of FIG. 1, by the use of bell bottoms in the embodiment of FIG. 2, an intensive intermixing of the various phases is assured while the counter-current principle is preserved as well as the plug or stopper principle which controls the downward flow and upward flow of reactants by reason of the built-in elements. Such built-in elements permit the reaction to be carried out with proper control of flow rates to obtain very definite times of stay.

In FIG. 3, the pressured reactor is provided with an electrode lining of carbon, graphite, or the like while a central electrode extends through the reaction mixture from the bottom wall of the reactor. In this instance, current will flow through the solution between the centrally disposed electrode, which may be of carbon or graphite, for example, and the reactor wall lining, which is of electrically conductive material, so as to form an electrode lining.

In FIG. 4, an arrangement is shown which combines the features of the embodiments of FIGS. 2 and 3, wherein both the centrally extending electrode and the bell bottoms or built-in elements are provided. An electrode lining is used in this instance so that suitable conduction between the electrode surfaces will occur through the reaction mixture. By reason of the bell bottom installations, a uniform and regulated flow rate and an intimate intermixing of the ingredients will be provided.

In the embodiments of FIGS. 3 and 4, a parallel connection is used whereby the current passes between the electrodes through the solution at any point along the extent of the solution or melt. In the case of the embodiments of FIGS. 1 and 2, on the other hand, the current could pass along only one course between the spaced apart electrodes protruding through the reactor wall.

In FIG. 5, bell bottoms are provided to subdivide the reactor into separate sub-zones, each having an electrode in contact with the liquid reaction mixture thereat. The electrodes protrude through the reactor wall and serve to supply electrical current to the individual zones, respectively, of the reactor for electrically heating the melt in such zone independently of one another depending upon the specific energy requirement in the various sub-zones. Of course, since less urea will be found in the lower sub-zones, the energy requirement for converting the remaining urea will vary accordingly.

In each substance, as will be appreciated by the artisan, the electrodes protruding through the reactor wall are insulatedly mounted on such wall and prevent leakage through the reactor thereat. Furthermore, where bell bottom installations are used, these are similar in construction to the bell bottoms used in distillation towers, whereby in the embodiments of FIGS. 2, 4, and 5, more intensive intermixing of the various phases is assured and very definite control of the flow rate and residence time of the ingredients within the reactor.

In accordance with the invention voltages can be used in the range of from about 1 to 200 volts, the frequencies being in the range from about 50 to 1000 cycles per second, and the amperages being a result of the geometry and the voltage of the electrodes, e.g. between about 500–1500 amperes.

The following examples are set forth for the purpose of illustrating the invention, and it is to be understood that the invention is not to be limited thereby. Generally, the process is operated in such a manner that the melamine level in the reactor amounts to about 50–95% by weight of the entire fused reaction mixture or melt mass. However, the figures are only statistical since in the practical performance of the operation, as may be appreciated, for instance in FIG. 3, the level of the liquid phase is maintained such that a relatively higher percentage of urea, and a relatively lower percentage of melamine are present in the vicinity of the point of entry of the urea, while close to the bottom of the reactor at the place where the melamine is drawn off, substantially nothing but pure melamine is present.

*Example 1*

A pressure reactor is used, for instance of the type shown in FIG. 3 herein, having a volume of 21 liters, the reactor being made from $V_4A$ Extra steel, clad with a titanium over-layer. The inside wall of the reactor is lined with graphite, the lining having a thickness of 5 cm. Through the lower end of the reactor, a centrally positioned carbon electrode is provided, such electrode terminating within the reactor at a point shortly below the top end thereof. For mechanical stability, the centrally positioned electrode is provided with a titanium core. The counter-electrode is formed by the graphite lining forming the inside wall of the reactor. The voltage needed in order to heat the reaction mixture is 6 volts at a current of 1,000 amperes, and this is obtained by applying a normal alternating current of 50 cycles/sec. (50 Hz.) between the reactor inside wall and the centrally positioned electrode, i.e. through the urea melt disposed in the reactor. The current supply is regulated so that a maximum temperature of 420° C. prevails in the reactor. Under these conditions, a transformation of 97% by weight of urea melt into melamine occurs, where 24 kg. of urea melt per hour, pre-heated in the usual manner to 200° C., and containing 2% by weight of ammonium chloride, are pumped into the reactor at a point near the upper end thereof, i.e. about ⅓ from the upper end. The pressure release for the autogenous or self-generated gas pressure which occurs during the reaction may take place by way of a throttle valve, such that a pressure of about 100 atmospheres absolute is maintained. Provision is made to keep the space occupied by the liquid phase at about ⅔ of the total volume capacity of the reactor, i.e. with the level of the liquid phase at approximately the level of the point of entry of the urea. At the bottom of the reactor, the liquid phase consisting substantially of melamine is drawn off, such that a statistical ratio of urea to melamine of about 20:80 is maintained in the reactor. The ammonium chloride contained in the melamine is separated by crystallization of the melamine with water, the melamine being obtained in a pure form.

(If this example is repeated without the addition of ammonium chloride, the other conditions being the same, the voltage needed to heat the reaction mixture is 110 volts at a current of 55 amperes, applying an alternating current of 50 cycles/sec. Under these conditions a transformation of 97% by weight of urea melt into melamine occurs, where 16 kg. of urea melt per hour are pumped in the reactor. The comparison shows a remarkedly increased throughput and conditions for the current which are easier to handle and safer than in the process of the parent application, Serial No. 193,020, now U.S. Patent No. 3,141,884 as aforesaid.)

*Example 2*

Under the same conditions as set forth in Example 1, the same reaction may be carried out, with the exception that an addition of 0.5% by weight of iron oxide as catalyst, based upon the urea melt charged, is used. The same output at the same transformation percent as obtained in Example 1 occurs in this instance, already at a temperature of 370° C., with the alternating current being correspondingly slightly adjusted to avoid the generation of excess heat.

In carrying out the process of the invention, the presence of water during the reaction should be avoided.

*Example 3*

The procedure of Example 1 is repeated in a reactor which is provided with a centrally positioned electrode extending downwardly through the top end of the reactor rather than through the bottom end thereof. The centrally positioned electrode terminates slightly above the lower end of the reactor. Under these conditions, the same results as set forth in Example 1 (97% by weight transformation) are obtained using the same current, amount per hour of urea and additive electrolyte, temperature, and pressure.

*Example 4*

Under the same conditions as set forth in Example 1, the same reaction is carried out, with the exception that 2% by weight of ammonium phosphate is used in place of the ammonium chloride. Substantially the same results as set forth in Example 1 (95% by weight transformation) are obtained in this case as well.

*Example 5*

Under the same conditions as set forth in Example 1, the same reaction is carried out, with the exception that 1.5% by weight of lithium chloride is used in place of the ammonium chloride. Substantially the same results as set forth in Example 1 (a transformation of 96% by weight) are obtained in this case as well.

*Example 6*

Under the same conditions as set forth in Example 1, the same reaction is carried out, with the exception that 3% by weight of boric acid is used in place of the ammonium chloride. Substantially the same results as set forth in Example 1 (a transformation of 95% by weight) are obtained in this case as well.

What is claimed is:

1. Process for the production of melamine by heating urea melt under pressure, which comprises carrying out the heating of urea at a temperature between about 300–500° C. under an autogenous pressure between about 50–300 atmospheres for a period of from about 2 minutes to 2 hours, in a closed reaction zone having a non-metallic lining, in the form of a melt admixture with at least one of an inorganic acid, inorganic acid salt, and inorganic acid anhydride as electrolyte additive in an amount between about 0.1–5% by weight of the urea present, and in the additional presence of ammonia, by passing an alternating electric current having a frequency of about 50–60 cycles per second through the admixture to generate heat therein as a function of the specific resistance of the urea to the current being passed therethrough and to form melamine, carbon dioxide, and ammonia, said electrolyte additive being practically completely dissociated under the reaction conditions so as to create an underlying conductivity which is practically unaffected by the various states of the chemical system present, and collecting the melamine in liquid form separately from the carbon dioxide and ammonia in gaseous form, said carbon dioxide and ammonia in gaseous form being recovered, cooled without change in pressure and converted into urea, and the urea formed thereby recycled back to the melamine process step in said zone.

2. Process for the production of melamine by heating urea under pressure, which comprises carrying out the heating of urea melt under pressure by passing an electric current through the urea melt in admixture with at least one of an inorganic acid, inorganic acid salt, and inorganic acid anhydride as electrolyte additive to generate heat therein as a function of the specific resistance of the urea to the current being passed therethrough for forming melamine, said electrolyte additive being dissociated under the reaction conditions to provide a conductivity unaffected by the reaction substances present.

3. Process according to claim 2 wherein the heating is carried out for a residence time between about 2 minutes and 2 hours at a temperature between about 300–500° C. and an autogenous pressure between about 50 and 300 atmospheres in a closed zone having a non-metallic lining, the electrolyte additive being present in an amount between about 0.1–5% by weight of the urea present.

4. Process according to claim 3 wherein the electrolyte additive is ammonium chloride.

5. Process according to claim 3 wherein the electrolyte additive is ammonium phosphate.

6. Process according to claim 3 wherein the amount of the reaction mass including urea, electrolyte additive and melamine present in said zone is maintained such that a constant amount between about 50–95% of said mass in said zone is present as melamine.

7. Process according to claim 6 wherein the electric current is alternating current.

8. Process according to claim 7 wherein the heating is carried out in the additional presence of ammonia by passing the admixture of urea and electrolyte additive along a reaction path in said zone in countercurrent to the ammonia, and recovering the melamine produced from said zone in an amount sufficient to preserve in said reaction mass in said zone a remaining amount of melamine within said 50–95%.

9. Process according to claim 8 wherein the heating is carried out under said pressure in the presence of a metallic catalyst selected from the group consisting of base metals, base metal oxides, and base metal salts.

10. Process according to claim 7 wherein the urea is preheated to about 200° C. to form the melt, the temperature is maintained between about 350–420° C. in said zone, the pressure being maintained at about 100 atmospheres, the ratio of urea to melamine being maintained at about 20:80, the residence time being about 40 minutes, the alternating current being at about 50 cycles per second, using a voltage of about 6 volts and a current of about 1000 amperes, and the electrolyte additive being ammonium chloride in an amount of about 2% by weight of the urea present.

11. Process according to claim 10 wherein the heating is carried out at about 370° C. in the presence of 0.5% by weight of iron oxide as catalyst.

12. Process according to claim 7 wherein the alternating current frequency is between about 50–1000 cycles per second, using a voltage between about 1–200 volts and a current between about 500–1500 amperes.

References Cited by the Examiner

UNITED STATES PATENTS

| | | | |
|---|---|---|---|
| 2,776,285 | 1/1957 | Dyer | 260—249.7 |
| 2,776,286 | 1/1957 | Lobdell | 260—249.7 |
| 3,122,541 | 2/1964 | Schmitt et al. | 260—249.7 |

JOHN D. RANDOLPH, *Primary Examiner.*

NICHOLAS S. RIZZO, *Examiner.*